A. P. ROTHERMICH.
AUTOMOBILE SIGNAL.
APPLICATION FILED MAY 11, 1916.
1,224,022.
Patented Apr. 24, 1917.
2 SHEETS—SHEET 2.
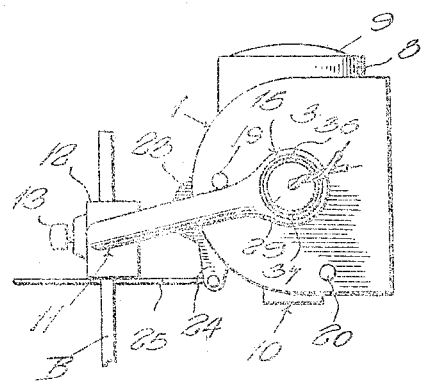
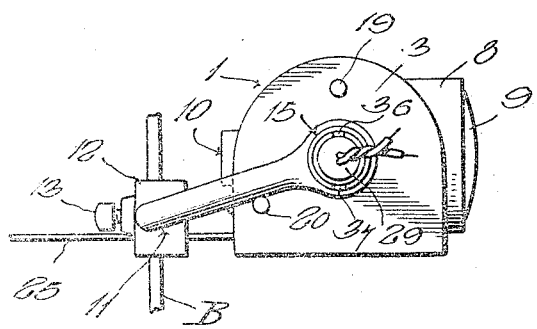
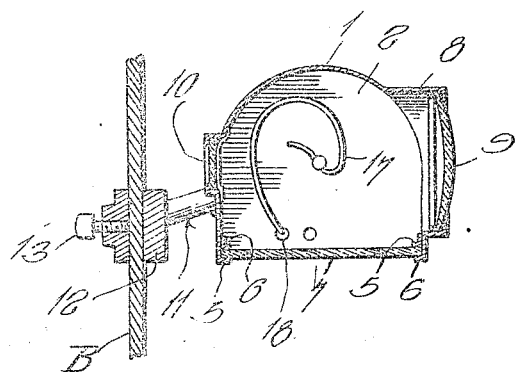
Inventor
A. P. Rothermich
Witness
H. Woodard
By H. B. Williamson
Attorneys

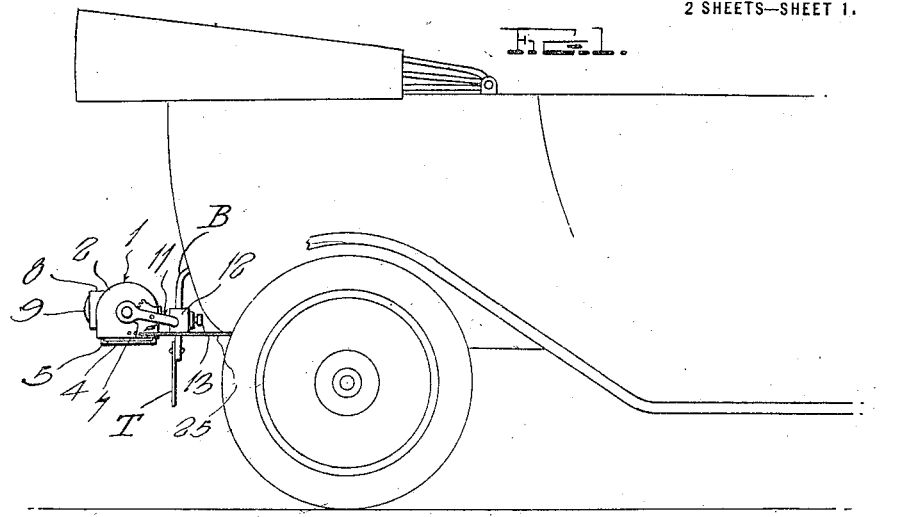
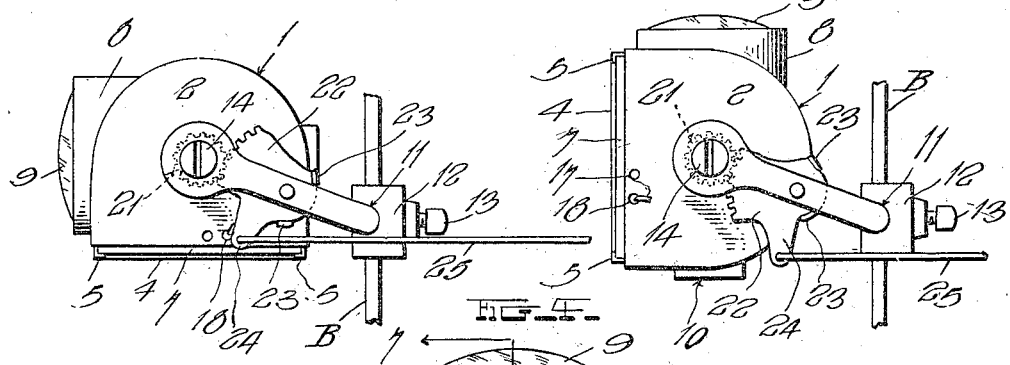
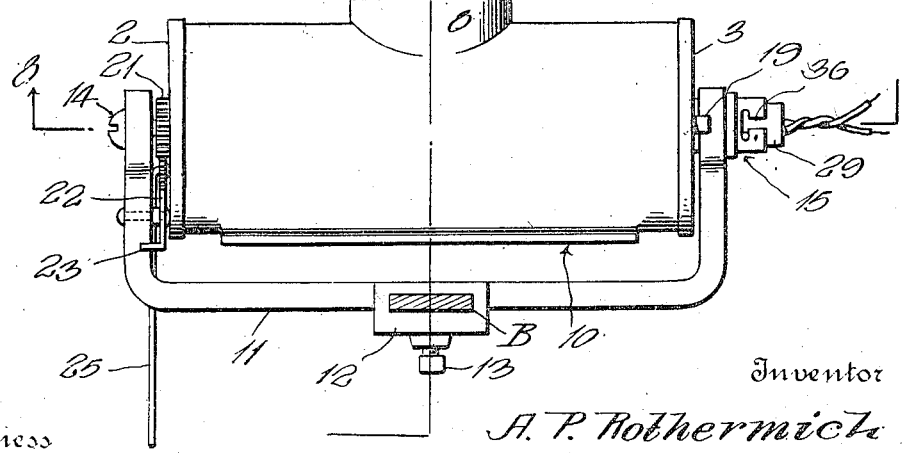

UNITED STATES PATENT OFFICE.

ANTON P. ROTHERMICH, OF ST. LOUIS, MISSOURI.

AUTOMOBILE-SIGNAL.

1,224,022.  Specification of Letters Patent.  Patented Apr. 24, 1917.

Application filed May 11, 1916. Serial No. 96,886.

*To all whom it may concern:*

Be it known that I, ANTON P. ROTHERMICH, a citizen of the United States, residing at St. Louis, in the State of Missouri, have invented certain new and useful Improvements in Automobile-Signals; and I do declare the following to be a full, clear, and exact description of the invention, such as will enable others skilled in the art to which it appertains to make and use the same.

This invention relates to signals adapted to be mounted on the rear end of automobiles and other vehicles for indicating to drivers of following vehicles the intentions of the driver in advance.

The object of the invention is to provide a device of this character so constructed as to normally operate as a tail or rear end lamp such as is now in use on automobiles and which at the will of the operator may be shifted to warn following vehicles of an intention to change the direction of the vehicle carrying the signal.

Another object is to construct a device of this character having a minimum number of simple parts which will not readily get out of order and yet produce a signal of maximum efficiency and which is operative for both day and night use.

With the above and other objects in view, the invention consists of certain novel features of construction, combination and arrangement of parts as will be more fully hereinafter described and claimed.

In the accompanying drawings:—

Figure 1 represents a side elevation of the rear portion of an automobile with this improved signal shown applied for use as a tail-end light, and shown in end elevation;

Fig. 2 is an enlarged end view of the signal with the parts in the position assumed when the device is used as an ordinary tail light;

Fig. 3 is a similar view showing the device arranged to display the warning signal;

Fig. 4 is a top-plan view thereof with the bracket to which the device is attached shown in transverse section;

Fig. 5 is a view similar to Fig. 3 taken from the opposite end of the device;

Fig. 6 is a view similar to Fig. 2 taken from the opposite end of the device;

Fig. 7 is a transverse section taken on the line 7—7 of Fig. 4; and

Fig. 8 is a longitudinal section taken on the line 8—8 of Fig. 4.

In the embodiment illustrated the signaling device constituting this invention is shown in Fig. 1 in normal position for use as a tail end light and comprises a hollow metallic semi-cylindrical casing 1, the flat ends 2 and 3 of which are crimped in engagement with the body portion thereof and the straight edge of the end 2 terminates short of the straight edges of the body of the casing, the other end 3 having its straight edge bent inwardly to form a securing flange 4 which is arranged flush with side flanges 5 formed on the straight edge of the body portion of the casing. Arranged inside the flanges 5 on the sides of the casing are parallel flanges 6 which together with the flanges 5 form guides for a flat front face or panel 7 which may be constructed of any suitable material preferably of glass and on which a warning device is impressed. This panel 7 is adapted to slide in the guides formed by the flanges 5 and 6 and to be movably mounted in the casing so that other panels may be substituted therefor when it is desired to change the character of the signal.

These panels 7 are preferably composed of red glass having the letters of warning of white or opaque glass to adapt the device for use either at night or during the day, the letters being readily read from a distance of several hundred feet. A circular holder 8 is secured to one side of the casing adjacent one straight edge thereof opening outwardly and in which is mounted a red glass lens 9 for use as a danger signal such as is now employed on ordinary tail lights.

In the side of the casing opposite to that carrying the lens 9 is a long narrow strip 10 of transparent material preferably of glass which is designed for illuminating the license tag at night when the casing is turned to position the warning panel 7 outward to indicate to a following vehicle any change to be made.

This casing 1 is rotatably mounted in a bracket 11 here shown U-shaped in configuration with a slotted boss 12 arranged midway of the ends of the cross bar thereof and which is designed to be engaged with an arm of an ordinary bracket carried by the automobile and on which the license tag is usually mounted, said bracket 11 being secured to the license bracket by a set screw 13. The free ends of the arms of the bracket 11 are shown enlarged and apertured to form bearings for the casing journals 14 and 15 which extend through the ends 2 and 3 of said casing. The journal 14 is fixed in one arm of the bracket 11 being threaded therein and extends through the pinion 21 and the end 2 of the casing being reduced at its inner end and provided with a transversely extending aperture 16 with which is engaged one end of a spring 17, said spring being coiled and having its other end engaged with an opening 18 formed in the casing end 2 adjacent the straight edge. The removable journal 14 thus performs the double function of a casing journal and of an anchor for the spring, while the spring operates to turn the casing and to secure the journal in engagement therewith. This spring exerts its tension to turn said casing in one direction, the turning movement thereof being limited by laterally projecting studs 19 and 20 on the end 3 of the casing which are so positioned as to engage the arm of the bracket 11 at that end of the casing so as to permit the casing to be turned one-fourth of a revolution only in either direction, either with or against the tension of the spring 17.

An annular pinion 21 is fixed to the casing end 2 on its outer face with the journal 14 extending therethrough and which is designed to mesh with a gear 22 pivoted on the arm of the bracket which carries the journal 14. This gear 22 is shown in the form of a sector pivoted intermediate of its ends to said bracket arm and the rear end of which opposite the teeth thereof is provided with laterally spaced outwardly extending lugs 23 positioned one on one side of the bracket arm and one on the other and which serves to limit the turning movements of said gear. An apertured arm 24 is also carried by this gear 22 and is designed to receive an actuating element 25 which may be in the form of a heavy steel wire which is disposed under the vehicle and extends to a point at the front thereof in convenient position for operation by the driver being preferably attached to the brake lever but it may be attached to any other lever convenient for use.

It will thus be understood that when a pull is exerted on the wire 25 it will be imparted to the casing 1 through the gear 22 and pinion 21 and thereby rotate said casing one-fourth of a revolution which will position the flat signal carrying panel 7 facing away from the rear of the vehicle and when so positioned this casing may be locked by any suitable means under the control of the operator. Immediately the lever is released the spring 17 will operate to return the casing to normal position with the red glass lens 9 facing away from the vehicle in the manner ordinarily used with tail lights of this character, and as shown in Fig. 1.

It will also be observed that when the casing is turned to position the warning panel 7 for use the transparent strip 10 will be disposed downwardly directly over the license tag so as to illuminate the latter and render it readily visible. The journal 15 is made in the form of a hollow cylindrical lamp socket having threaded engagement with the aperture in the arm of the bracket 11 which supports the end 3 of the casing. This journal extends into the casing 1 through the end 3 and has mounted in its inner end an incandescent electric light bulb 27 which is connected therewith by a bayonet slot connection. This hollow journal 15 is provided in its opposed side walls at the inner end thereof with two L-shaped slots as 28, one arm of each of which is arranged longitudinally of the journal and opens through the inner end thereof, the other arms of the slots being disposed peripherally and extending in the same direction. Pins or studs as 30 project laterally from diametrically opposite sides of the lamp 27 and are designed to enter the slots 28 and to be engaged with the peripherally extending arms thereof. Spring contacts 32 and 33 are disposed in said journal in position for engagement with contacts 34 and 35 carried by the lamp so that when said lamp is inserted in said socket the contacts of the socket will be engaged with those of the lamp to insure electric connection between them.

The outer end of the journal 15 is provided with oppositely disposed T-shaped slots 36 and 37, the heads of the T being arranged inwardly and extending peripherally of the journal with the shanks thereof extending outwardly and opening through the outer edge of the hollow journal and which are designed to receive an electric connecting member carrying the conducting wires for conveying the current to the lamp 27. Spring pressed contacts 38 are aranged in the outer end of the cylindrical journal 15 and are designed to engage coöperating contacts 31 carried by the wire connecting plug 29.

It will be understood that this lamp 27 may be connected with any suitable source of electricity on the automobile to which the invention is applied and that the current may be supplied and cut off by a push button (not shown) in the usual manner.

In the use of this improved signal when the bracket 11 thereof is engaged with the bracket B at the rear of the automobile, the casing is so placed as shown in Fig. 1 with the red lens 9 facing away from the rear of the automobile and providing a red light when the electric lamp 27 within the casing is lighted. The license tag T hangs from the bracket B just underneath the casing and when the device is in the above mentioned position the flat transparent panel 7 is disposed facing downward and produces the illumination necessary for the license tag.

When the operator desires to change the method of operating his vehicle the lever with which the actuating member 25 is connected is operated to exert a pull on said rod which is transmitted through the gears 22 and 21 to the casing 1 and revolves said casing one-fourth of a revolution or 90 degrees the movements thereof being limited by the engagement of one of the studs 19 or 20 with the bracket arm which supports the end of the casing on which they are mounted. This partial turn of the casing brings the flat transparent panel 7 up and facing away from the rear of the vehicle so that the signal contained thereon which is usually the word "Slow" may indicate to other vehicles in the rear the intention of the driver to make a change in the operation of the vehicle carrying the signal.

From the above description it will be obvious that there is a red light showing at the rear of the vehicle at all times and that the license tag is always illuminated.

I claim as my invention:

1. In a signal of the class described, a bracket having spaced arms, a casing mounted to rotate between said arms, a journal carried by one of said arms and extending into the casing through one end thereof, said journal having an aperture in its inner end, and a coiled spring having one end extending through the aperture in said journal and its other end anchored to the casing, whereby said spring operates to turn the casing and to secure said journal thereto.

2. In a signal of the class described, a U-shaped bracket having bearings in the free ends of its arms, a light casing disposed between said arms and having journal openings in its ends, a pinion fixed to the outer face of one end of said casing concentric with the opening therein, a removable journal having threaded engagement with the bearing in one of said bracket arms and extending loosely through said pinion and the registering journal opening in said casing end, a hollow journal removably mounted in the bearing of the other bracket arm and extending loosely through the opening in the other end of the casing, lighting means mounted in said hollow journal and disposed within said casing, a sector-shaped gear pivoted to the inner face of the bracket arm at the end of the casing carrying the pinion, said gear meshing with said pinion, laterally spaced lugs extending outwardly from said gear at opposite sides of said arm for engaging said arm and limiting the turning movement of the gear and casing in opposite directions, an actuating member connected with said gear to rotate said casing, and a spring connected to return the casing after actuation.

In testimony whereof I have hereunto set my hand in presence of two subscribing witnesses.

ANTON P. ROTHERMICH.

Witnesses:
DAVID CAMPBELL,
M. P. PHILLIPS.